United States Patent Office 2,882,128
Patented Apr. 14, 1959

2,882,128

PREPARATION OF POTASSIUM SULPHATE FROM CALCIUM SULPHATE AND POTASSIUM CHLORIDE

Jacques Lafont, Saint-Gratien, France, assignor to Societe d'Etudes Chimiques pour l'Industrie et l'Agriculture, Paris, France, a French company No Drawing. Application September 13, 1955
Serial No. 534,151

Claims priority, application France September 16, 1954

7 Claims. (Cl. 23—121)

It is known how to prepare potassium sulphate from calcium sulphate and potassium chloride. Various processes of this general type have been put forward, wherein the calcium sulphate is either employed in its normal or natural condition, or after activation thereof, or with a conversion of the calcium sulphate into intermediate compounds such as magnesium sulphate or ammonium sulphate.

Among the processes using calcium sulphate in its natural state, some operate in an aqueous solution, the reaction of KCl with calcium sulphate producing with variable yields such double salts as syngenite $CaSO_4$, $K_2SO_4$, $H_2O$ and/or the penta-salt $5CaSO_4$, $K_2SO_4$, $H_2O$, which are subsequently decomposed to obtain $K_2SO_4$.

It is also known that when operating in the presence of an aqueous ammonia solution, either a double salt is obtained when a very small excess of potassium chloride is used over the stoichiometrical ratio, the yields then being substantially improved with respect to those obtained with an aqueous solution, or directly $K_2SO_4$ if a very large excess of potassium chloride is present. In the latter case the large amounts of mother-liquor employed contain a substantial proportion of potassium chloride which can only be recovered as the result of complex processes involving precipitation of the double salts followed by re-treatment.

Finally, it is also known as disclosed in the English Patent No. 717,998 to Societe Potasse & Produits Chimiques, that potassium sulphate can be obtained directly by reacting potassium chloride with calcium sulphate in practically stoichiometrical proportions at substantially ordinary temperature and in a concentrated aqueous ammoniacal medium containing about 50% or more ammonia, provided a sufficiently high pressure is applied, of about 3 kg./sq.cm. absolute.

It has now been found possible to reduce the minimum concentration of ammonia in the aqueous solutions, by operating in a temperature range below ambient, and specifically to reduce said minimum concentration to less than 40% by working at a temperature below 5° C.

This unexpected and unpredictable improvement over the procedure disclosed in the above patent further presents a number of valuable advantages, to wit:

(1) It becomes possible to use greatly reduced amounts of ammoniacal solution, since the ratio of ammoniacal solution to $CaSO_4$ is always less than 2.60.

(2) The quantity of ammonia used for the conversion of a given amount of calcium sulphate into potassium sulphate is reduced twofold, in that both the amount of solution, and the concentration of $NH_3$ in the solution, are simultaneously reduced.

Both the advantages just listed, which are obtained without having to use any excess of KCl over the stoichiometrical proportions, are valuable factors in that they facilitate the recovery of $NH_3$ from the mother-liquor, either by distillation or by the known process of precipitation of $CaCl_2$ ammoniacates and decomposition of said ammoniacates.

Furthermore, the particular temperature and concentration conditions used in accordance with this invention make it possible to carry out the reaction at atmospheric pressure, thereby substantially reducing the $NH_3$ losses and eliminating the delicate problems involved in the feeding of solids into pressure containers and separating liquids from solids under pressure on completion of a reaction.

It has, moreover, been found that the results of the process can be improved by preparing the $K_2SO_4$ in a continuous two-stage process of the counterflow type, as follows:

In a first stage, $CaSO_4$ together with an amount of KCl less than the stoichiometric ratio are introduced for reaction into a hydro-ammoniacal solution containing KCl and $CaCl_2$ produced in a second stage to be described presently.

On termination of this first stage, that is, when the conversion rate has become negligibly low, the solid product is separated from the liquid by centrifuging or otherwise. The mother liquor is passed to a distillation stage while the moist solids are treated in a second stage of the process with a fresh hydroammoniacal solution and a fresh charge of KCl, the proportions being such that the combined amounts of KCl added in both stages correspond to the stoichiometric proportion with respect to the $CaSO_4$ used. The supply of fresh constituents in the second stage makes it possible to obtain a substantially increased conversion rate during the end period of the second stage as compared to the single-stage procedure. This is because an accumulation of $CaCl_2$ in the mother liquor considerably slows down the reaction rate between the $CaSO_4$ and the KCl. This drawback is avoided when the moist partially reacted solid is taken up in a body of fresh hydroammoniacal solution.

When preceding as just described at a temperature under 5° C., the amount of $NH_3$ required to convert a part of the $CaSO_4$ used is further substantially reduced.

In the process described above, the calcium sulphate may be used in any desired form, such as gypsum, hemihydrate or anhydrite.

Two practical examples of the method of this invention are described below for purposes of illustration but not of limitation.

Example 1

100 parts of gypsum containing 79 parts $CaSO_4$
87 parts of KCl
113 parts of water
93 parts of $NH_3$ are reacted at a temperature of —3° C. at atmospheric pressure, with moderate agitation, during three hours.

The mother liquor is then separated off by filtration and $K_2SO_4$ is obtained after washing with a hydroammoniacal solution.

The yield of the conversion of the gypsum to $K_2SO_4$ is 98% and the mother liquor carries away with it 2 parts of KCl.

The same operation as above is carried out under similar conditions as to concentration (same amount of ammonia solution and same $NH_3$ content in the solution), but at ordinary temperature, i.e. 20 to 25° C., and at an absolute pressure of about 2 kg./sq.cm. After the hydroammoniacal washing step there is then obtained a solid consisting of a mixture of syngenite $CaSO_4$, $K_2SO_4$, $H_2O$ and KCl; the conversion yield from gypsum to $K_2SO_4$ is 50%.

Thus, under concentration conditions which at ordinary temperature are conductive to a precipitation of a calcium and potassium double salt, a decrease in temperature makes possible a direct production of $K_2SO_4$ with excellent yield.

When operating at ordinary temperature to produce $K_2SO_4$ directly with high yields, it would be necessary to increase both the amount of ammonia solution relative to $CaSO_4$ used, and the concentration of $NH_3$ in the solution, in accordance with the teachings of the patent mentioned above. There would thus be used per 100 parts of gypsum 101 parts water and
127 parts $NH_3$ As compared to this method for directly producing $K_2SO_4$ at ordinary temperature, a greatly increased yield in $NH_3$ is had when operating at low temperature. Thus, comparing in the two instances the ratios $CaSO_4/NH_3$, there is had:

At —3° C. _____ 0.85
At ordinary temperature _____ 0.62 or an increase of 37%.

Example 2

In a first step, 108 parts natural gypsum containing 92.6% $CaSO_4$, $2H_2O$
65 parts KCl derived from chloride containing 58–60 $K_2O$ mother liquor derived from the second stage of the reaction, and containing:

105 parts water,
    86 parts $NH_3$
    21.5 parts $CaCl_2$
    3 parts KCl, are reacted together at —3° C. at atmospheric pressure.

In less than one hour, with moderate agitation, there is obtained potassium sulphate with a yield of about 72% in terms of the initial gypsum, there being separated on the one hand:

(a) A moist cake containing 28 parts gypsum
72.7 parts $K_2SO_4$
8 parts insoluble materials
4.7 parts KCl
11 parts water of impregnation
7 parts $NH_3$
6 parts $CaCl_2$, and (b) A mother-liquor containing:

108 parts water
79 parts $NH_3$
62 parts $CaCl_2$
0.8 part KCl.

From the mother liquor $NH_3$ can be recovered by any known procedure such as distillation or precipitation of $CaCl_2$ ammoniacates and decomposition of the ammoniacates.

In a second stage the moist cake is treated with 95 parts water
78 parts $NH_3$
20.8 parts KCl The mixture is reacted for one hour at —3° C. at atmospheric pressure with moderate agitation, and $K_2SO_4$ is obtained with a yield of about 98%, there being separated:

(a) A moist cake containing 2 parts gypsum
99.2 parts $K_2SO_4$
8 parts insoluble
6.5 parts water
5 parts $NH_3$
1.3 parts $CaCl_2$, and (b) Mother-liquor containing 105 parts water
80 parts $NH_3$
3 parts KCl
21.5 parts $CaCl_2$ This liquor is recycled after being enriched with $NH_3$.

Under the described conditions the $CaSO_4/NH_3$ ratio is equal to 0.92, representing an 8% gain in $NH_3$ over the single-stage process at low temperature, and a 48% gain over the single-stage process at ordinary temperature.

What I claim is:

1. The method of preparing potassium sulphate which comprises reacting calcium sulphate with a practically stoichiometric amount of potassium chloride in an aqueous ammonia solution containing less than 50% $NH_3$ by weight at a temperature not exceeding about 5° C. whereby the reaction is performed at atmospheric pressure, and separating potassium sulphate precipitate from the liquid phase.

2. The method of preparing potassium sulphate which comprises reacting calcium sulphate with a practically stoichiometric amount of potassium chloride in an aqueous ammonia solution containing about 40–45% $NH_3$ by weight at a temperature between about +5° C. and about —5° C. whereby the reaction is performed at atmospheric pressure, and separating potassium sulphate precipitate from the liquid phase.

3. The method of cyclically preparing potassium sulphate which comprises in a first stage reacting calcium sulphate with a charge of potassium chloride in an amount lower than the stoichiometric proportion at a temperature not exceeding about 5° C. in a first aqueous ammonia solution containing potassium chloride and calcium chloride as obtained from a previous cycle of the process, separating the solid reaction product of said first stage, treating in a second stage the said separated solid product with a fresh charge of potassium chloride in an amount such that the sum of the amounts added in both stages is substantially the stoichiometric proportion relative to the calcium sulphate introduced in the first stage, in a fresh ammonia solution containing about 40 to 45% $NH_3$ by weight at a temperature not exceeding about 5° C., separating potassium sulphate precipitate from the ammonia solution resulting of said second stage, re-using the said ammonia solution as said first ammonia solution in the first stage of a subsequent cycle of the process and treating the liquid phase separated from the first stage of the process for recovery of $NH_3$.

4. The method of claim 2 wherein the liquid phase is distilled for recovery of $NH_3$.

5. The method of claim 2 wherein the liquid phase is treated for recovery of $NH_3$ by precipitation of calcium chloride ammoniacates and decomposition of said ammoniacates.

6. The method of claim 3 wherein the liquid phase from the first stage of the process is distilled for recovery of $NH_3$.

7. The method of claim 3 wherein the liquid phase from the first stage of the process is treated for recovery of $NH_3$ by precipitation of calcium chloride ammoniacates and decomposition of said ammoniacates.

References Cited in the file of this patent

FOREIGN PATENTS 437,652     Great Britain _____ Nov. 4, 1935
717,998     Great Britain _____ Nov. 3, 1954

OTHER REFERENCES

Abel and Fanto: "Thermodynamics of the Conversion of KCl—$K_2SO_4$ With the Aid of $CaSO_4$," Transactions of the Faraday Society, vol. 44, pages 97–108.